United States Patent [19]

Hernandez et al.

[11] Patent Number: 4,686,522

[45] Date of Patent: Aug. 11, 1987

[54] METHOD OF EDITING GRAPHIC OBJECTS IN AN INTERACTIVE DRAW GRAPHIC SYSTEM USING IMPLICIT EDITING ACTIONS

[75] Inventors: Irene H. Hernandez; Carol S. Himelstein; John S. Wang, all of Austin, Tex.

[73] Assignee: International Business Machines Corporation, Armonk, N.Y.

[21] Appl. No.: 703,161

[22] Filed: Feb. 19, 1985

[51] Int. Cl.⁴ .............................................. G09G 1/16
[52] U.S. Cl. .................................. 340/709; 340/723; 340/747; 340/721; 340/727; 340/731
[58] Field of Search ............... 340/709, 710, 747, 744, 340/723, 724, 727, 712; 178/18

[56] References Cited

U.S. PATENT DOCUMENTS 4,464,652  8/1984  Lapson et al. ...................... 340/710
4,586,035  4/1986  Baker et al. ......................... 340/723

FOREIGN PATENT DOCUMENTS 59-41047  3/1984  Japan .................................. 340/709

OTHER PUBLICATIONS

"The Lisa Computer System", *Byte*, Feb. 1983, pp. 33-50, Williams.
Macintosh "Macpaint" instructions, copyright 1983, Apple Computer Corporation.

*Primary Examiner*—Gerald L. Brigance
*Attorney, Agent, or Firm*—Richard E. Cummins; James H. Barksdale

[57] ABSTRACT

A method is described for editing graphic objects in an interactive draw graphic system which selectively displays a menu of available editing actions in response to operation of one mouse button by the operator and allows the operator to cursor select the specific edit action from the menu to be made active by operating a second mouse key. The operator may also cursor select the object to be edited by operation of the second mouse key. Once the editing action is selected and made active, the menu is hidden (not displayed) and the editing action remains active in the system until positive steps are taken by the operator to either terminate the edit function or change the active editing action. The operator, therefore, does not have to return to the selection process after each specific editing operation. The previous editing operation is implied for the next edit operation.

7 Claims, 7 Drawing Figures

METHOD OF EDITING GRAPHIC OBJECTS IN AN INTERACTIVE DRAW GRAPHIC SYSTEM USING IMPLICIT EDITING ACTIONS

TECHNICAL FIELD

This invention relates in general to interactive information handling systems and, in particular, to an improved method and system for assisting the operator of such systems to interactively edit graphic objects that are displayed by the system on the display unit.

BACKGROUND ART

The term "interactive information handling system" refers to an information handling system in which the system is highly dependent upon interaction with the operator of the system. The nature of the interaction generally involves either the system displaying to the operator on a display device, such as a video terminal or an all-points addressable display unit, certain information, and the operator responding by entering information into the system via an input device (e.g., keyboard, mouse, tablet, voice, etc.). The interaction may also reflect that the operator has entered information into the system and the system responds to that information by displaying some predetermined information to the operator.

The degree of interaction between the operator and the system varies, depending upon the system configuration, the application being run by the particular program, and the task that the operator has chosen to execute.

A large number of information handling systems currently exist which perform on an interactive basis. A very large percentage of personal computers currently are involved in processing applications that are highly interactive. Examples of such applications are the various text processing programs and spreadsheet-type programs that are available to operators of various personal computers.

Another type of application for information handling systems that is becoming increasingly important is referred to as graphics. Some of the initial graphic applications were directed to what is generally referred to as business graphics, e.g., graphs or charts. In these applications the system is programmed to take a table of numeric data, for example, and present it as a graphic object, that is, a pie chart, a bar chart, or some similar type chart. These systems were interactive to the extent that the operator was able to select, for example, the type of chart, the size of the chart, and the placement of the chart on the screen. In some applications, the operator could even select the various shadings or colors or the components of the chart. The function of editing these business graphics charts was limited in most applications to editing actions involving the entire object, such as deletion, removing, and scaling-type editing actions.

More recently, graphic applications have been developed which are truly interactive and which permit the operator to actually draw graphic objects on the screen. In these applications, the operator controls the position and movement of the cursor so that lines can be traced on the display screen by the system. The system is generally capable of receiving cursor movement data from the keyboard and/or several other operator controlled devices, such as a mouse, a joystick, or a data tablet. The applications which permit the operator to actually draw objects on the screen are sometimes referred to as "interactive draw graphics" to distinguish them from the business type of graphic applications.

The commercial success of application programs are generally dependent upon how "user friendly" the program appears to the operator, rather than how fast such a program can actually run. This is especially true when the system being used is a personal computer and the operator is generally not very experienced in interfacing with computer systems. In interactive draw graphic applications, the ability of the operator to edit graphic objects is a necessity, and the manner in which the editing operation is implemented is one of the most important criteria in assessing the user friendliness of an interactive draw graphic program.

The editing of graphic objects is similar, in some respects, to the editing of text. Both text and graphic editing applications provide for the functions of inserting, deleting, moving, and copying. Graphic editing applications also include such unique functions, such as scaling up/scaling down, stretch/shrink, and rotate, which are not found in text editing applications. Scaling up/scaling down editing differs from stretch/shrinking, in that the scale function involves the entire object, while the stretch/shrink editing action involves a change in the portion of the object in the direction of the movement of the cursor. In the former, for example, a square will always remain a square, and a circle will always remain a circle. In the shrink/stretch editing action, the square becomes a rectangle and a circle becomes an ellipse or an oval.

In both text editing and graphic editing, a cursor is generally employed to designate the "point of action." In most text processing applications, the cursor is generally the conventional blinking dash-type cursor. In some graphic applications, the conventional blinking cursor is replaced by a "pointing cursor" to designate the point of action. The other aspect of the editing function, namely the specific editing action, for example, insert, move, or rotate, is provided in various ways by prior art interactive draw graphic systems.

In some systems, the available editing actions are selectively displayed as a command bar at the bottom of the screen in response to the operator actuating a predetermined function key and a second cursor is then used to select the desired action from the command bar.

In other systems, the command bar is always displayed at the bottom of the screen and the operator selects the editing command by positioning the cursor to the command. In these latter systems, while only one cursor is displayed, its appearance is changed from a blinking cursor to a pointing cursor during the process which is selecting the particular editing action.

It should be understood that editing functions in a graphic application are generally not motivated by the need to "correct" an error, such as occurs generally in text processing applications. In graphic applications, it is often more efficient to modify an object that has been drawn previously and stored in a library. As a result, a series of sequential editing actions are generally involved on the retrieved object to modify the original graphic object to the desired object. The interface between the operator and the system during this process should involve interactions which are straightforward, natural, easy to learn, and simple to remember.

The operator should not be required to move the point of action from the graphic object to the bottom of the screen and back to the object merely to select a different graphic editing action. The operator should also not be required to cycle through a series of editing actions in order to reach the desired action.

The present invention overcomes the above problems and provides an improved method for editing graphic objects in an interactive draw graphic system.

SUMMARY OF THE INVENTION

In accordance with the present invention, an interactive draw graphic system is provided with an interactive draw graphic arrangement which permits the operator to easily and efficiently edit a graphic object that is displayed on the display device. The arrangement, as described, employs a conventional, two button mouse device which the operator uses to control the position of the cursor on the screen in a conventional manner. One mouse button is referred to as the Action Select Key, while the other button is referred to as the Object Select Key. The function of the Action Select Key is to cause the system to display an edit action menu which lists all available edit actions and to change the normal system cursor to a pointing cursor. The system causes these functions to occur in response to the operation of the Action Select Key. The operator then positions the pointing cursor adjacent the desired editing action by suitably moving of the mouse, and presses the Object Select Key. The pointing cursor is changed to a cursor symbol, depicting the selected editing action and the menu disappears.

The operator next positions the cursor adjacent the object that is to be edited and presses the Object Select Key on the mouse. If the editing action is of the type that involves movement of the object, such as move, rotate, scale, etc., the Object Select Key is held depressed while the mouse is moved by the operator. The object on the screen moves in accordance with the direction and the extent of movement of the cursor, as controlled by the mouse and the particular edit action. When the object is suitably located, the operator releases the Object Select Key and proceeds to the next operation, which could be the same edit action on another displayed object, a different editing action on the same or another object, or another operation other than editing. If further editing is required, the operator merely has to press the Action Selection Key to have the menu re-appear and select a different action. If the same type editing action is desired on another object, the operator merely has to position the cursor adjacent the second object and press and hold the Object Select Key. A very efficient operator interface is therefore provided for the edit function of an interactive draw graphic system.

It is therefore an object of the present invention to provide an improved method for editing graphic objects in an interactive draw graphic system.

Another object of the present invention is to provide an interactive editing method for graphic objects which permits the operator to select the graphic editing action from a menu that is displayed selectively at the current location of the cursor in response to action by the operator.

Objects and advantages, other than those mentioned above, will become apparent in the following description when read in connection with the drawing.

DESCRIPTION OF THE PREFERRED EMBODIMENT

Figure 1:
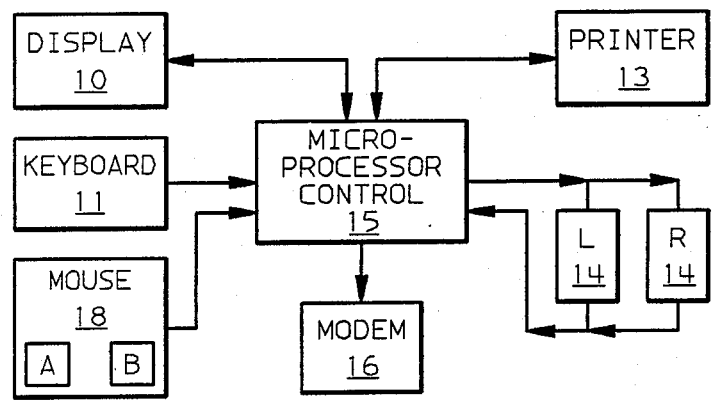
FIG. 1 is a block diagram of an interactive information handling system in which the method of the present invention is advantageously employed.

FIG. 1 illustrates the general arrangement of a typical information handling system. The system shown comprises a display device 10 which comprises a conventional video text-type terminal for displaying information to the operator, a keyboard 11 which the operator uses to enter information, including commands and data, into system, a printer 13 which functions to provide hard copy output of information selected by the operator, a pair of diskette drives, 14L and 14R, which function to transfer information between the system and the magnetic storage diskettes that are removably associated with the diskette drives, and which store both program information, text information, and graphic information.

System components 10, 11, 13, 14L, and 14R are connected, as shown in FIG. 1, to the microprocessor Block 15 which functions as the overall control for the system and interrelates the system components in a manner to perform their specific functions at the appropriate time. The system of FIG. 1 also includes a modem 16 which functions to interconnect the system to other system through various communication links.

Since the system of FIG. 1 is adapted to process graphic applications, such as interactive draw type graphics, it should be assumed that the display device 10 is an all-points addressable type of graphic display device, in which each individual picture element (PEL) may be addressed, in contrast to conventional text-type displays in which only a character box is addressable. Since interactive draw graphic applications are to be run by the system, an auxiliary input device 18 is also provided to insure rapid positioning of the cursor on the screen, since positioning of the cursor by keys on the keyboard is not as efficient as input device 18. Such devices are well known in the art, and for purposes of the present description, it will be assumed that device 18 is a conventional "mouse" equipped with two function keys or buttons. Devices having similar functions, such as data tablets, could also be employed for input device 18.

Figure 2:
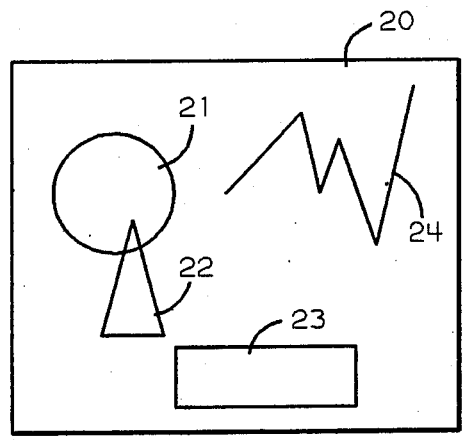
FIG. 2 is a diagrammatic view of one example of a display screen containing objects that may be edited by the method of the present invention.

It should also be assumed that the system of FIG. 1 is provided with a suitable interactive draw graphics type program which permits the operator to draw graphic objects on the screen of device 10 similar to the four objects, 21, 22, 23, and 24 shown in FIG. 2.

FIG. 2 represents the screen of device 10, or a defined section of that screen, sometimes referred to in the art as a window. The four objects comprise circle 21, triangle 22, rectangle 23, and a zigzag line 24. Each of these graphic objects are individually defined in the system as a graphic object and were generated by the operator following a series of interactions with the system to produce each object. It is assumed that each of the objects were either "drawn" originally by the operator or retrieved or copied from a library of graphic objects which the system provides to the operator.

Figure 6:
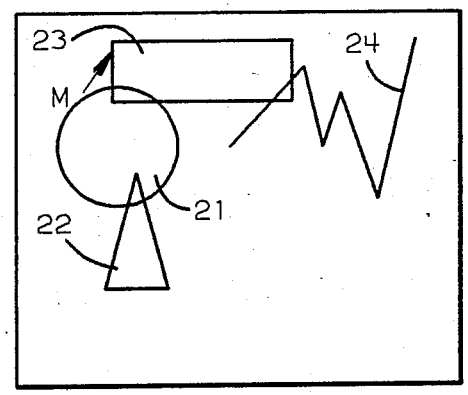
FIG. 6 is a view of the screen shown in FIG. 5 after the operator has moved the graphic object.

It should be further assumed, for purposes of understanding the present invention, that the operator desires to edit the graphic information displayed in FIG. 2, particularly to move the rectangle 23 from the position shown in FIG. 2 to the position shown in FIG. 6.

Figure 7:
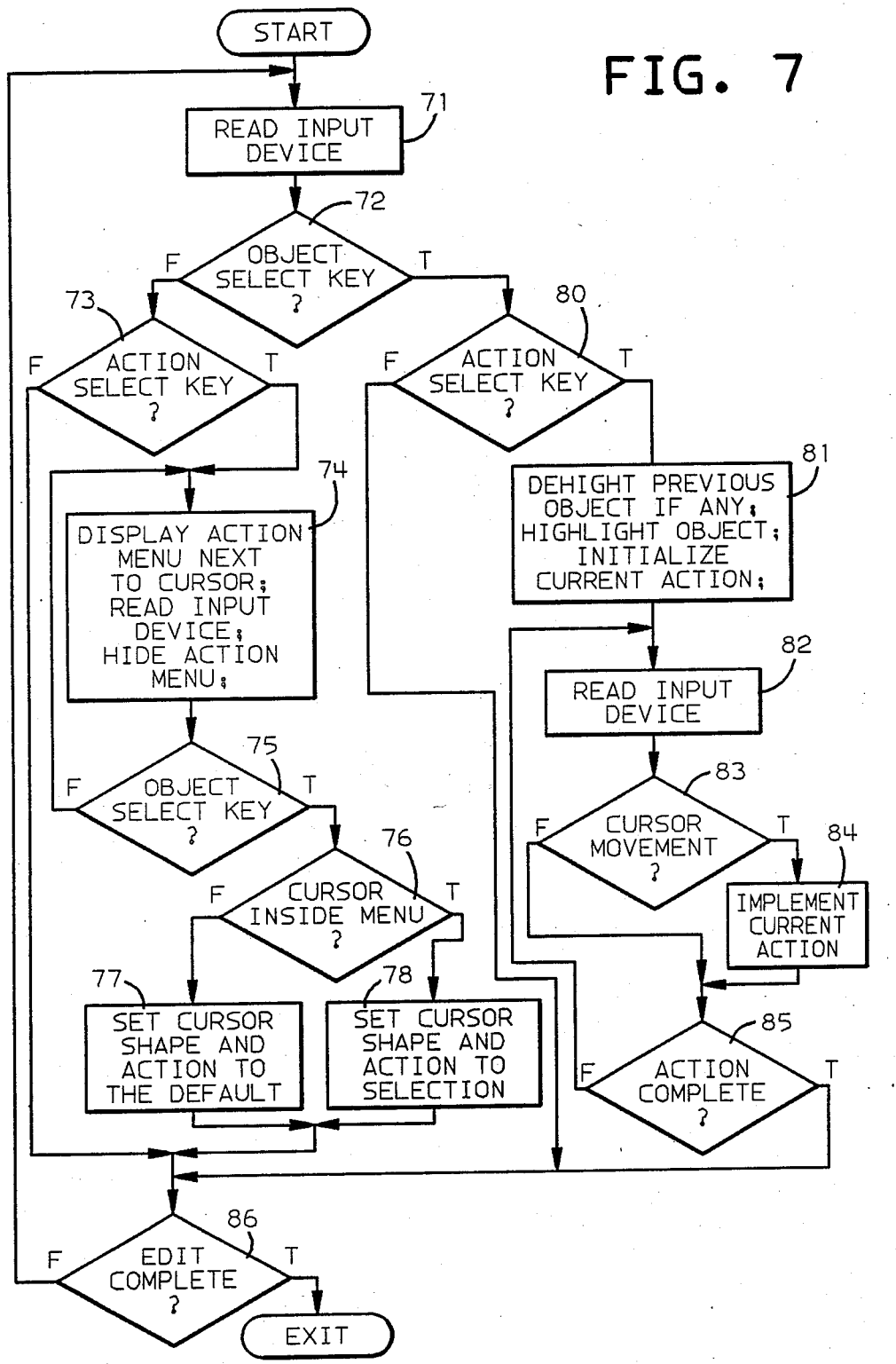
FIG. 7 is a flowchart, illustrating the various interactive steps in the improved method of interactively editing graphic objects in an interactive draw graphic system.

The interactive steps involved in that move edit operation will now be described in connection with the flowchart of FIG. 7 and the display screens shown in FIGS. 2-6.

Figure 3:
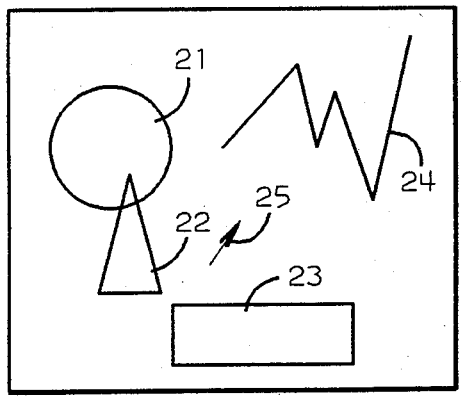
FIG. 3 is a view of the screen shown in FIG. 2, illustrating the display of the pointing cursor.

In order to start the graphic editing operation, the operator presses a predetermined function key on the keyboard or takes some equivalent action which the system interprets as an instruction to enter the grahpic object editing mode. Entering into this mode displays the pointing cursor 25 on the screen, as shown in FIG. 3. The system then monitors the input device 18, i.e., the mouse, as indicated by Block 71 on the flowchart. As the operator moves the mouse, the system causes the pointing cursor 25 to track the movement of the mouse. The system is also monitoring the position of the Action Selection Key 18A and the Object Selection Key 18B.

To select an edit operation, the operator presses the Action Select Key, which is detected by Block 73. This action will usually occur after the operator has positioned the pointing cursor in a blank area of the screen. Block 73, sensing that the Action Key has been depressed, causes the menu 27, shown in FIG. 4 to be displayed in a frame next to the position of cursor 25. The display menu 27 lists all of the available edit actions that the operator may engage in. The system continues to monitor the output of the mouse device for selection of the particular edit action, as indicated by Block 74. An edit action is selected from the menu by the operator moving the mouse to position the pointing cursor adjacent the move edit action with at least a portion of the cursor within the frame of the menu and pressing the Object Select Key 18B, as shown in Block 75.

Figure 4:
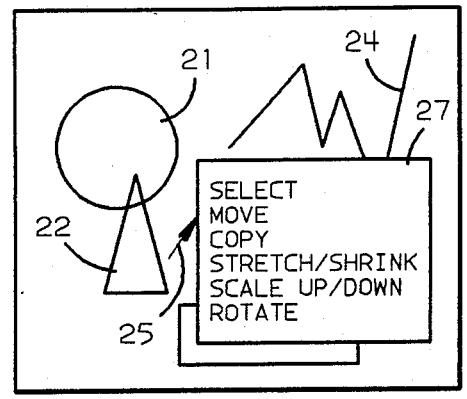
FIG. 4 is a view of the screen shown in FIG. 3, illustrating the display of the edit action menu.
Figure 5:
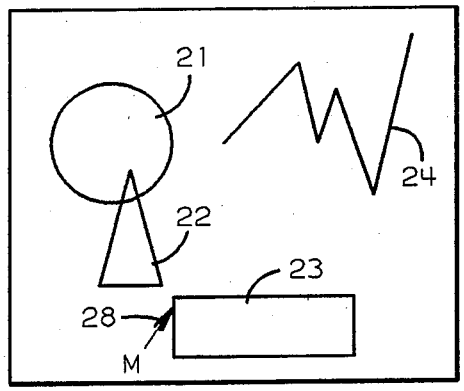
FIG. 5 is a view of the screen shown in FIG. 4, illustrating the selection of an object after the move edit action has been selected.

The system first determines the position of the cursor relative to the displayed menu and its frame when the Object Select Key is pressed. If the cursor arrowhead is within the menu frame, as shown in FIG. 4 and indicated by Block 76, the new cursor 28, shown in FIG. 5, is displayed and the move edit action is made active in the system and the menu becomes hidden to the operator. Block 77 and Block 78 indicate the setting of the new cursor 28 and setting of the edit action.

The operator then positions the cursor 28 next to the graphic object to be moved by suitably moving the mouse. When the cursor 28 is positioned adjacent to the rectangle 23, as shown in FIG. 5, the operator again presses the Object Select Key, as shown in Block 72. Block 80 in the flowchart of FIG. 7 determines if the cursor 28 is near a graphic object. Since it is next to the rectangle, the rectangle is highlighted, as indicated by Block 81, providing a visual feedback signal to the operator that the object to be moved has been recognized by the system.

Block 81 also represents operation of the system to determine if an edit action is currently active and, if so, the various initializing actions that must occur, depending upon the specific action involved. In the case of the move operation, the system is initialized so that the movement of the cursor from its current position will be translated to a corresponding movement of the rectangle from its current position. It should be understood that the move edit function does not involve any rotational movement of the rectangle. However, the rectangle may be moved on any diagonal line that the cursor follows. Block 83 of the flowchart reads the movement of the mouse and causes the rectangle to "move" in acordance with the movement of the mouse. The system in Block 84 continuously erases and re-draws the rectangle to provide an indication of movement on the screen.

As long as the move edit operation is active, movement of the mouse will cause movement of the selected object, as shown in Block 85. Releasing of the Object Select Key terminates the movement of the rectangle, but allows the operator to select another object to be moved, since the move action remains active until another edit operation is selected from the menu or the entire edit function is terminated at Block 86 by the operator pressing the End Function Key on the keyboard.

The operator is thus permitted to move other objects on the screen without returning to the menu at the end of the first edit operation. In this type of editing method, the active editing operation remains implicit until the operator takes some positive action to either terminate the entire edit function or replace the active edit action by selecting a different edit action from the menu. It has been found that by having an editing action remain active or implicit until terminated or changed, considerably simplifies the graphic editing operation. The action that is currently active or implicit is reflected in the cursor and will also be displayed on the status line of the display should the operator need to confirm what action is current and active.

The following paragraphs set forth programming language statements, which persons skilled in the art of programming interactive information handling systems and interactive draw graphic applications will find informative in connection with implementing the method described in the specification and defined in the claims. The pseudo code statements follow generally the organization of the flowchart of FIG. 7.

In the following it is assumed that the workstation is under mouse and keyboard device control. The mouse controls the movement of a visible pointing cursor which allows the operator to determine the current cursor position on the screen. The mouse is also assumed to have two keys (buttons): (1) one key is used for selection of objects and menu options and is called OBJECT_SELECT_KEY, and (2) the other for requesting menu presentation and is called ACTION_SELECT_KEY.

The application calls a routine to query the mouse input device to determine if a mouse key has been pressed (CALL READ_INPUT_DEVICE). READ_INPUT_DEVICE will return the selected key and the current X, Y location of the pointing cursor.

If the OBJECT_SELECT_KEY is pressed, a routine is called to determine if the X and Y location returned from READ_INPUT_DEVICE is currently pointing to a graphic object (e.g., rectangle, circle). If the operator pointed to a graphic object, the graphic object is highlighted by a routine (CALL HIGHLIGHT_OBJECT). If an implicit action is in progress (CASE ACTIVE_ACTION OF), the application performs initialization prior to performing the requested implicit action. In the case of MOVE, the application makes a copy of the selected object, and erases the original object on the screen. (CALL COPY_INIT) For SCALE_UP, SCALE_DOWN, STRETCH, and SHRINK actions, the application must get the length of the line from the center of the object to the current cursor location and stores the results in an information save area. (CALL S_INIT) If no implicit action is currently active, then no initialization needs to be made.

Once initialization of the implicit actions occurs, the current X, Y location of the selected object are saved (SAVX and SAVY). The application then reads the input device again (CALL READ_INPUT_DEVICE) to determine the status of the mouse key and the X, Y location of the pointing cursor. If the application determines, by comparing the new X, Y with the SAVX and SAVY that the pointing cursor moved (CALL CHECK_CURSOR_MOVEMENT), the implicit action is executed (CASE ACTIVE_ACTION OF).

If the action is a MOVE or COPY, a routine is called (CALL MOVE/COPY_OBJECT) to erase the previous copy of the selected object and draw a copy of the selected object next to the new cursor position.

If the action is a ROTATE, a routine is called (CALL ROTATE_OBJECT) to get an amount of circular rotation accumulated from the previous position to the current cursor location, erase old copy of the object, and draw the object with the rotation applied.

If the action is STRETCH or SHRINK, a routine is called (CALL STRETCH/SHRINK_OBJECT) to get length of line from center of the object to the new cursor position, use the proportion of the new length to old length to get proportion to stretch or shrink the object in the direction of the cursor movement, erase old copy of the object, and draw the object with the stretch or shrink applied.

If the action is SCALE_UP or SCALE_DOWN, a routine is called (CALL SCALE_OBJECT) to get length of line from the center of the selected object to new cursor position, use the proportion of the new length to old length to get proportion to scale entire object, erase old copy of the object, and draw the object with scaling applied.

The input device is continually read and the implicit action executed until the implicit action is complete (UNTIL ACTION_COMPLETE).

If the ACTION_SELECT_KEY is pressed, a menu of actions will be displayed. (CALL DISPLAY_ACTION_MENU) The input device is read again (CALL READ_INPUT_DEVICE) to wait for the operator to select one of the actions on the action menu. As the operator moves the pointing cursor, the menu is hidden (CALL HIDE_ACTION_MENU) and re-displayed until the OBJECT_SELECT_KEY is pressed. When the OBJECT_SELECT_KEY is pressed, a routine is called to determine if the selection point is inside the menu area. (CALL FIND_IN_MENU_AREA) If the selected point is inside the menu area, a routine is called to get the action selected from the menu and set the ACTIVE_ACTION to be performed. (CALL GET_ACTION_SELECTED) A routine is then called to change the shape of the pointing cursor to reflect the selected implicit action. (CALL SET_CURSOR_SHAPE) If the operator selected outside the menu area, the application will set a default ACTIVE_ACTION and set the CURSOR_SHAPE to reflect the default implicit action.

The application continually queries the input device (CALL READ_INPUT_DEVICE) until editing is complete. (UNTIL EDIT_COMPLETE)

```
PSEUDO CODE FOR IMPLICIT ACTIONS IN INTERACTIVE
DRAW GRAPHICS
REPEAT
CALL READ_INPUT_DEVICE (SELECT_KEY_TYPE,
X, Y)
IF SELECT_KEY_TYPE = OBJECT_SELECT_KEY THEN
CALL FIND_OBJECT (X, Y, OBJECT_PTR)
IF OBJECT_PTR <¼¼> NIL THEN
  (*OBJECT LOCATED AT X, Y LOCATION)
CALL HIGHLIGHT_OBJECT (OBJECT_PTR)
CASE ACTIVE_ACTION OF
MOVE: CALL MOVE_INIT (OBJECT_PTR, X, Y)
COPY: CALL COPY_INIT (OBJECT_PTR, X, Y)
SCALE_UP, SCALE_DOWN, STRETCH, SHRINK:
  CALL S_INIT (OBJECT_PTR, X, Y)
NO_ACTION : (*NO IMPLICIT ACTION CURRENTLY
  ACTIVE*)
ENDCASE
REPEAT
CALL SAVE_CURSOR_LOCATION (X, Y, SAVX, SAVY)
CALL READ_INPUT_DEVICE (SELECT_KEY_TYPE,
X, Y)
CALL CHECK_CURSOR_MOVEMENT
  (X, Y, SAVX, SAVY, CURSOR_MOVED)
IF CURSOR_MOVED THEN
CASE ACTIVE_ACTION OF
MOVE, COPY: CALL MOVE/COPY_OBJECT
  (OBJECT_PTR, X, Y)
ROTATE: CALL ROTATE_OBJECT
  (OBJECT_PTR, X, Y)
STRETCH, SHRINK: CALL STRETCH/SHRINK_OBJECT
  (OBJECT_PTR, X, Y)
SCALE_UP, SCALE_DOWN: CALL SCALE_OBJECT-
  (OBJECT_PTR, UP, X, Y)
NO_ACTION :
  (*NO IMPLICIT ACTION CURRENTLY ACTIVE*)
ENDIF
UNTIL ACTION_COMPLETE
CALL DEHIGHLIGHT_OBJECT(OBJECT_PTR)
ENDIF (*OBJECT_FOUND*)
ELSE
IF SELECT_KEY_TYPE = ACTION_SELECT_KEY THEN
REPEAT
CALL DISPLAY_ACTION_MENU (MENU_PTR, X, Y)
CALL READ_INPUT_DEVICE (SELECT_KEY_TYPE,
X, Y)
CALL HIDE_ACTION_MENU (MENU_PTR, X, Y)
UNTIL SELECT_KEY_TYPE = OBJECT_SELECT_KEY
CALL FIND_IN_MENU_AREA (X, Y, IN_MENU_AREA)
IF IN_MENU_AREA THEN (*CURSOR INSIDE MENU
AREA*)
CALL GET_ACTION_SELECTED (ACTIVE_ACTION)
CALL SET_CURSOR_SHAPE
  (ACTIVE_ACTION, CURSOR_SHAPE)
ELSE
ACTIVE_ACTION = DEFAULT_ACTION
CURSOR_SHAPE = DEFAULT_CURSOR_SHAPE
ENDIF (* IN_MENU_AREA*)
ENDIF (*ACTION_SELECT_KEY*)
ENDIF (*SELECT_KEY_TYPE*)
UNTIL EDIT_COMPLETE (*TERMINATION OF EDITING*)
```

While the invention has been particularly shown and described with reference to the preferred embodiment thereof, it will be understood by those skilled in the art that various changes in the form and details may be made without departing from the scope and spirit of the invention.

We claim:

1. A method of editing displayed graphic objects in an interactive draw graphic system having (a) a display device with an operator positionable cursor for displaying to an operator graphic objects to be edited, and (b) an input device having means to control the position of said cursor on the display device and first and second two position keys for providing to said system three different control signals, said method comprising the steps of:
  (A) displaying to said operator a menu of available graphic editing actions in response to a first said control signal being sent from said input device to said system when said operator presses and releases said first key,
  (B) establishing one of said available editing actions as the active editing action including the steps of;
    (1) positioning said cursor in a first position relative to said one editing action, and
    (2) sending a second said control signal from said input device to said system when said second key is pressed and released by said operator while said cursor is in said first position, and
  (C) selecting one of said objects to be edited by said active editing action including the steps of;
    (1) positioning said cursor in a second position relative to said one said object, and
    (2) sending a third control signal from said input device to said system in response to said operator pressing said second key when said cursor is at said second position and holding said second key pressed until said active editing action on said selected object is completed,
whereby said operator may continue editing the same or another said object with said active editing action by repeating step (C) without the necessity of repeating steps (A) and (B).

2. The method recited in claim 1 in which said step of displaying said menu displays said menu in a predetermined positional relationship with respect to said cursor.

3. The method recited in claim 2 in which said step of establishing includes the step of maintaining the selected editing action active until a different editing action is established or said editing operation is terminated.

4. The method recited in claim 3 further including the step of modifying the appearance of said cursor to reflect the editing action that is established as said active editing action.

5. The method recited in claim 4 further including the step of hiding said menu from said operator after an editing action has been established as said active editing action.

6. The method recited in claim 5 further including the steps of terminating said editing action on said selected object by releasing said second key, and editing a second said object with the active editing action without repeating said step of establishing.

7. The method recited in claim 6 in which said system includes a keyboard having an edit operation end key, further including the step of terminating said editing operation when said operator presses said end key.

* * * * *